United States Patent [19]

Heller

[11] Patent Number: 5,186,068

[45] Date of Patent: Feb. 16, 1993

[54] GEAR REDUCER WITH BACKLASH ELIMINATOR

[75] Inventor: Werner H. Heller, West Valley, N.Y.

[73] Assignee: Peerless-Winsmith, Inc., Springville, N.Y.

[21] Appl. No.: 718,292

[22] Filed: Jun. 20, 1991

[51] Int. Cl.$^5$ .............. F16H 1/16; F16H 1/20; F16G 25/06; F16E 43/04

[52] U.S. Cl. .................. 74/425; 74/401; 74/409; 384/519; 384/540

[58] Field of Search ............ 74/409, 425, 427, 440, 74/441, 458, 395, 400, 401; 384/519, 540

[56] References Cited

U.S. PATENT DOCUMENTS

| | | | |
|---|---|---|---|
| 1,778,258 | 10/1930 | Jennings | 384/540 |
| 1,894,414 | 1/1933 | Olson | 384/540 X |
| 1,913,718 | 6/1933 | Morgan | 74/427 |
| 1,966,358 | 7/1934 | Robak | 74/458 |
| 2,163,035 | 6/1939 | Grupe | 74/400 X |
| 2,165,761 | 7/1939 | Pelphrey | 74/440 |
| 2,949,036 | 8/1960 | Ellis | 384/519 X |
| 2,959,977 | 11/1960 | Franke | 74/458 |
| 3,006,211 | 10/1961 | Mueller | 74/440 |
| 3,220,277 | 11/1965 | Dixon | 74/409 X |
| 3,463,030 | 8/1969 | Nuccel | 74/409 |
| 4,261,218 | 4/1981 | Eagan, Sr. | 74/427 X |
| 4,852,419 | 8/1989 | Kittel et al. | 74/425 X |
| 4,900,960 | 2/1990 | Becker et al. | 74/425 X |
| 4,917,511 | 4/1990 | Katsube | 384/540 |
| 4,987,791 | 1/1991 | Nakahashi et al. | 74/425 |
| 4,993,277 | 2/1991 | Adam et al. | 74/409 X |

FOREIGN PATENT DOCUMENTS

| | | | |
|---|---|---|---|
| 917534 | 1/1947 | France | 74/400 |
| 59-34069 | 2/1984 | Japan | 74/409 |
| 152136 | 10/1920 | United Kingdom | 384/519 |
| 574582 | 1/1946 | United Kingdom | 384/519 |

Primary Examiner—Leslie A. Braun
Assistant Examiner—David E. Henn
Attorney, Agent, or Firm—Niew, Kurz, Bergert & Tamburro

[57] ABSTRACT

A gear speed reducer having an input shaft formed with a worm which meshs with a worm gear mounted on an output shaft disposed a fixed distance from and at right angles with respect to the input shaft. The worm is provided with an involute thread that progressively becomes thinner from one end to the other end of the worm. An adjustable cartridge rotatably mounts one end of the shaft and the cartridge is adjustably mounted to permit axial adjustment of the shaft to bring a new section of the thread of the worm into engagement with the worm gear to eliminate backlash therebetween. The adjustment is quickly and easily performed without having to remove the reducer from service.

5 Claims, 1 Drawing Sheet

GEAR REDUCER WITH BACKLASH ELIMINATOR

BACKGROUND OF THE INVENTION

This invention relates generally to worm gear speed reducers and more particularly to a worm gear speed reducer in which the backlash between the worm and worm gear may be quickly adjusted and, when necessary, readjusted to near zero without having to remove the speed reducer out of service.

Worm gear speed reducers are often used in operations which require a high degree of precision and it is therefore necessary that zero or minimal backlash between the worm and worm gear of the reducer be maintained. Typical industrial applications include machine tools, indexing equipment, robotic positioners, rotary tables, servo positioning, all of which mandate precise power transmission between the worm and worm gear. Backlash may occur in a worm gear speed reducer at the time of initial assembly because of inaccurate machining and/or assembly operations or may develop in the reducer after use because of wear on the teeth of the worm gear or on the thread of the worm. Various proposals have been offered in attempting to eliminate the undesirable backlash and typical proposals are illustrated in U.S. Pat. Nos. 3,220,277, 3,463,030 and 4,261,218. However none of these proposals enables the backlash between the worm and the worm gear to be quickly eliminated by a convenient adjustment mechanism without taking the reducer unit out of service.

SUMMARY OF THE INVENTION

Accordingly the primary object of this invention is to provide a novel worm gear speed reducer in which the high speed input shaft and worm is adjustable with respect to the worm gear to virtually eliminate backlash. After a period of use the worm may be readjusted quickly and without removing the unit from service to eliminate any backlash which may have been created through wear on the mating worm and worm gear.

Another object of this invention is to provide the above novel worm gear speed reducer in which a worm is formed on the high speed input shaft, with the worm and shaft being axially adjustable to enable different sections of the worm to mesh with the worm gear.

Still another object of this invention resides in the provision of the above novel worm gear speed reducer wherein the thread of the worm becomes progressively thinner from one end of the worm to the other to permit adjustment of the backlash between the worm and worm gear as the input shaft is axially adjusted.

A further object of this invention resides in the provision of the above worm gear speed reducer wherein one end of the high speed input shaft is rotatably mounted in a cartridge which is adjustable in the housing of the reducer to cause axial adjustment of the input shaft and thereby the worm with respect to the worm gear so as to eliminate backlash between the worm and worm gear as necessary.

Another object of the invention resides in the provision of the above novel worm gear speed reducer wherein the cartridge threads into the housing so that after the reducer has been in use the cartridge may be adjusted to move a thicker section of the thread of the worm into engagement with the worm gear and thereby eliminate backlash which developed because of wear between the matching thread section of the worm and the worm gear. This adjustment may be performed a number of times throughout the life of the speed reducer thereby extending the life of the reducer and increasing the productivity of the operation of which the reducer forms a part.

Other objects of the invention will become apparent from reading the following detailed description of the invention wherein reference is made to the accompanying drawings.

DETAILED DESCRIPTION OF THE DRAWINGS

Figure 2:
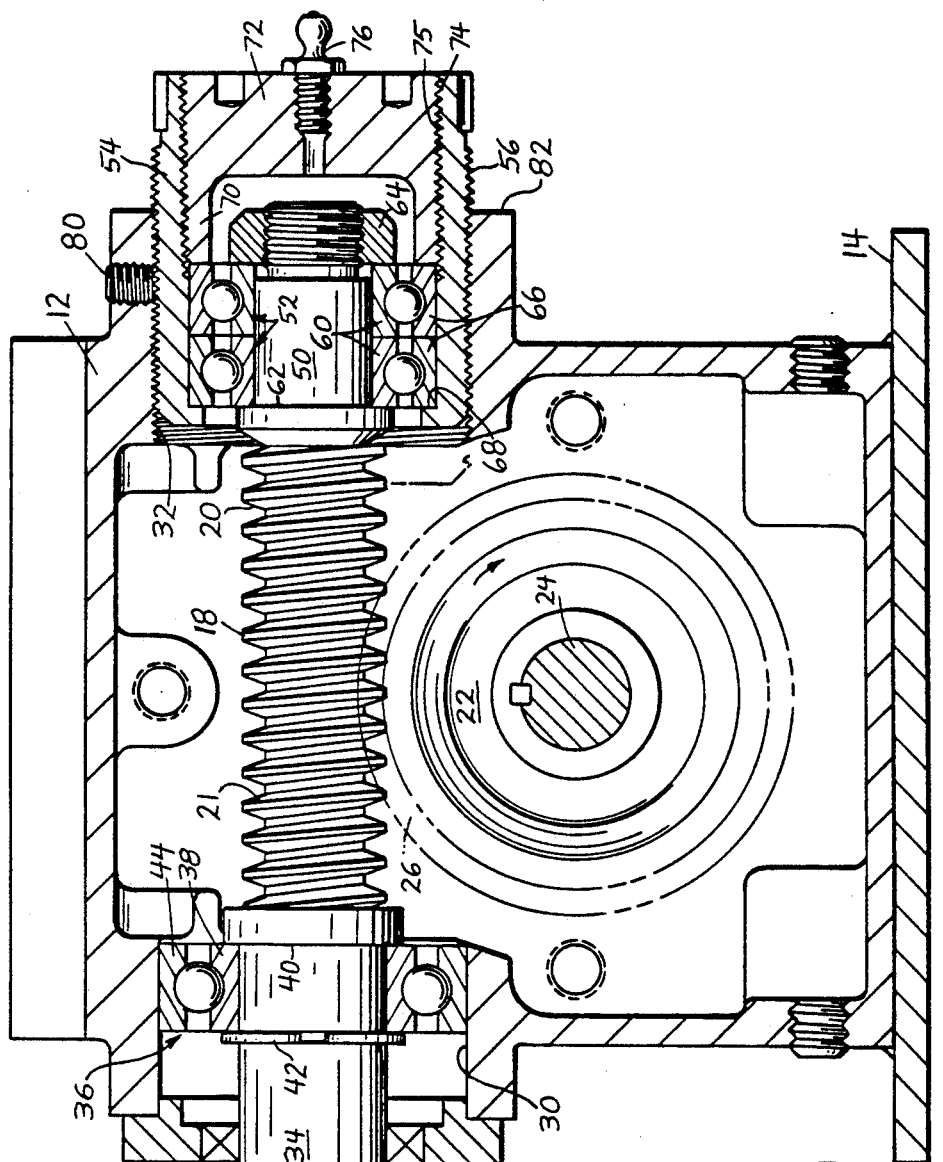
FIG. 2 is a fragmentary sectional view taken generally along line 2—2 of FIG. 1, illustrating the high speed input shaft and the adjustment mechanism by which the shaft and worm are axially adjusted to eliminate backlash.
Figure 1:
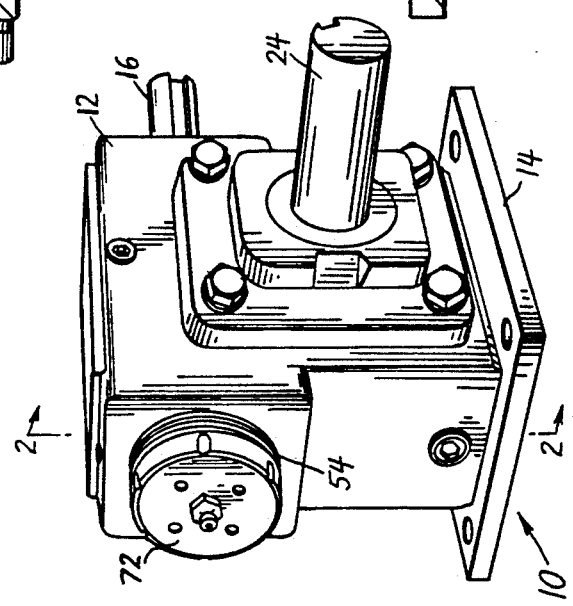
FIG. 1 is a generally perspective view of the worm gear speed reducer of the invention illustrating the backlash adjustment mechanism mounting the outboard end of the high speed input shaft.

Referring now to the drawings the worm gear speed reducer 10 includes a housing 12 welded on a flat base plate 14. A high speed input shaft 16 is disposed in the upper portion of housing 12 and includes a worm section 18 provided with an involute thread 20. Commonly, shaft 16 is formed of steel with at least worm section 18 being hardened.

Disposed in the lower portion of housing 12 is a worm gear 22 often made of bronze, which is keyed on an output shaft 24 that is rotatably mounted in housing 12 and spaced from and disposed at right angles to input shaft 16 in conventional fashion. Worm gear 22 is provided with involute teeth 26 which mesh with a mating section of thread 20 on worm 18. Shaft 24 and worm gear 22 are rotatably mounted in housing 12 but are fixed against axial and radial movement by properly retaining the support bearings (not shown) for shaft 24 in housing 12.

The upper portion of housing 12 includes aligned smooth bore 30 and threaded bore 32. Shaft 16 includes an inboard bearing end 34 supported by a bearing 36, the inner race 38 of which is retained on section 34 between a shoulder 40 and a snap ring 42. The outer race 44 of bearing 36 fits closely within bore 30 but is free to slide axially therein so as to permit axial adjustment of shaft 16 as will be described. A bearing seal assembly 46 is mounted around shaft section 34 at the end of bore 30 to retain lubricant within bearing 36 and to keep dirt out of the bearing area.

The outboard end 50 of shaft 16 is rotatably mounted by a pair of bearings 52 within a cylindrical cartridge 54 provided with fine threads 56 on its outer diameter which thread in and out of mating threads in bore 32. The inner races 60 of bearings 52 are retained on outboard shaft section 50 between a shoulder 62 and a bearing lock nut 64 which threads on the outer threaded end on shaft 16. The outer races 66 of bearings 52 are locked between an annular flange 68 on cartridge 54 and an annular flange 70 of locking ring 72, the outer diameter of which is provided with threads 74 which thread into mating internal threads 57 provided within the outer end of cartridge 54. A fitting 76 is provided for lubrication of bearings 52.

Because of their respective bearing mountings, the center distance between the center lines of input shaft 16 and output shaft 24 is fixed within housing 12.

As shown in FIG. 2 the pitch on each side of the thread 20 on worm 18 is constant but the pitch of thread 20 on the leading side or face 21 is slightly larger than the pitch on the trailing side of the thread. Consequently, the thread becomes progressively thinner as you move from the outboard end 50 toward the inboard end 34 of shaft 16. This is accomplished by machining the leading face 21 of thread 20 on a CNC machine from outboard end 50 toward inboard end 34. In fabricating worm 18 the thinner sections of thread 20 adjacent inboard end 34 are slightly undersize what a normal optimum thread would be, while the thicker sections of thread 20 adjacent outboard end 50 are slightly oversize. The thinner thread section accommodates some initial inaccurate machining and assembly of mating parts and the thicker thread sections compensate for excessive wear after use. This feature in combination with the adjustable cartridge 54 enables shaft 16 to be axially adjusted so that a selected section of thread 20 may engage with teeth 26 of worm gear 22 to reduce backlash between the mating parts to virtually zero.

During initial assembly of the gear reducer components, with shaft 24 and worm gear 22 in place, input shaft 16 and cartridge 54 are positioned as far to the right as possible as shown in FIG. 2 so that a section of worm 18 having thinner threads is in driving engagement with teeth 26. Cartridge 54 is then threaded into bore 32 as shaft 16 is slowly rotated to bring a section of the thread 20 into full surface engagement with teeth 26 with zero backlash. Cartridge 54 is then locked in place by a pair of set screws 80 threaded down into housing 12 and bearing on the outside diameter of cartridge 54. Because shaft 16 is axially adjustable to a bring a selected section of thread 20 into engagement with teeth 26, any slight misalignment which may have occurred during assembly or slight out of tolerance machining of the worm gear or worm itself are automatically compensated for by engagement with that selected section of thread 20.

After reducer 10 has been in use and worm 18 and worm gear 22 have been run in together, causing wear on the softer worm gear, shaft 16 may be quickly readjusted to remove any backlash which may have developed without necessitating removal of reducer 10 from its on line service position. This is quickly accomplished by loosening set screws 80 and rotating cartridge 54 into threaded bore 32 while slowly turning shaft 16 until a thicker section of thread section 20 comes into full surface engagement with teeth 26 with virtually zero backlash. Cartridge 54 is again locked in place by tightening screws 80 and the reducer is quickly returned into service. The entire readjustment of shaft 16 and worm 18 requires but a few minutes.

Throughout the life of reducer 10 shaft 16 may be readjusted as necessary as worm gear 22 wears to remove any backlash that develops because of that wear. Each time an adjustment is made by rotating cartridge 54 inwardly into bore 32 a new thicker section of thread 20 is brought into engagement with teeth 26 to eliminate the backlash which may develop. The amount of axial adjustment for shaft 16 varies with the size of reducer 10. For example shaft 16 may be adjusted from ⅜ on smaller units up to ¾ on larger units.

Various modifications are possible without departing from the spirit of the invention. For example cartridge 54 may be mounted on the inboard end of the shaft 16 rather than the outboard end as shown in FIG. 2. In addition instead of using the locking set screws 80 as shown in FIG. 2 a jam nut may be provided on the outer end of threads 56 to jam against the end face 82 of bore 32 to lock cartridge 54 in its set position.

The invention may be embodied in other specific forms without departing from the spirit or essential characteristics thereof. The present embodiments are therefore to be considered in all respects al illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A gear reducer comprising a housing, a worm gear rotatably mounted in said housing, an input shaft including a worm having a thread which engages said worm gear, aid thread becoming progressively thinner from one end of said worm to the other end, first and second bearing means mounted on said shaft at opposite ends of said worm and rotatably mounting said shaft in said housing, adjustment means connected to said housing and said second bearing means, said adjustment means comprising a cylindrical cartridge mounted in said housing, said cartridge having an outer surface and an inner surface, said housing and said outer surface having a cooperating means thereon for enabling movement of said cartridge in said housing along the axis of said input shaft, said second bearing means having an outer race axially fixed within said cartridge adjacent said inner surface, and releasable locking means mounted within said cartridge for securing said second bearing means to said cartridge, whereby said cartridge may be axially adjusted in said housing to move said second bearing means and said shaft axially in said housing to bring a selected thicker section of said thread of said worm into engagement with said worm gear, thereby compensating for wear between said worm and said worm gear after the gear reducer has been in use.

2. The gear reducer of claim 1, comprising locking means for locking said cylindrical cartridge in a set position in said housing.

3. A gear reducer comprising a housing, a worm gear rotatably mounted in said housing, an input shaft including a worm having a thread which engages said worm gear, said thread becoming progressively thinner from one end of said worm to the other end, first and second bearing means mounted on said shaft at opposite ends of said worm and rotatably mounting said shaft in said housing, adjustment means for adjusting said shaft axially comprising a cylindrical cartridge mounted in said housing, said cartridge having an outer surface and an inner surface, said housing and said outer surface having threaded cooperating means thereon for enabling movement of said cartridge in said housing along the axis of said input shaft, said second bearing means having an outer race axially fixed within said cartridge adjacent said inner surface, and releasable locking means mounted within said cartridge for securing said second bearing means to said cartridge, whereby said cartridge may be axially adjusted in said housing to move said second bearing means and said shaft axially in said housing to bring a selected thicker section of said thread of said worm into engagement with said worm gear.

4. The gear reducer of claim 3, comprising locking means for locking said cylindrical cartridge in a set position in said housing.

5. The gear reducer of claim 3, said first bearing means moving axially with said shaft as said cartridge is adjusted.

* * * * *